(12) United States Patent
Moricca et al.

(10) Patent No.: US 11,373,776 B2
(45) Date of Patent: Jun. 28, 2022

(54) INTEGRATED ION-EXCHANGE DISPOSAL AND TREATMENT SYSTEM

(71) Applicant: GeoRoc International, Inc., Chevy Chase, MD (US)

(72) Inventors: Salvatore Moricca, New South Wales (AU); Paul Heath, Sheffield (GB); Martin William Alexander Stewart, New South Wales (AU)

(73) Assignee: GEOROC INTERNATIONAL, INC., Chevy Chase, MD (US)

( * ) Notice: Subject to any disclaimer, the term of this patent is extended or adjusted under 35 U.S.C. 154(b) by 1119 days.

(21) Appl. No.: 15/864,536

(22) Filed: Jan. 8, 2018

(65) Prior Publication Data

US 2018/0197648 A1    Jul. 12, 2018

Related U.S. Application Data

(60) Provisional application No. 62/443,254, filed on Jan. 6, 2017.

(51) Int. Cl.
| | |
|---|---|
| *G21F 9/16* | (2006.01) |
| *G21F 9/02* | (2006.01) |
| *G21F 9/12* | (2006.01) |
| *G21F 5/005* | (2006.01) |
| *B09B 5/00* | (2006.01) |
| *G21F 9/36* | (2006.01) |
| *G21F 9/00* | (2006.01) |
| *G21F 5/06* | (2006.01) |
| *G21F 5/002* | (2006.01) |
| *B09B 3/20* | (2022.01) |

(52) U.S. Cl.
CPC ................ *G21F 9/162* (2013.01); *B09B 3/20* (2022.01); *B09B 5/00* (2013.01); *G21F 5/002* (2013.01); *G21F 5/005* (2013.01); *G21F 5/06* (2013.01); *G21F 9/008* (2013.01); *G21F 9/02* (2013.01); *G21F 9/12* (2013.01); *G21F 9/167* (2013.01); *G21F 9/36* (2013.01)

(58) Field of Classification Search
CPC . G21F 9/16; G21F 9/162; G21F 5/005; G21F 9/02; G21F 9/12; G21F 9/167
USPC .......................................................... 588/7
See application file for complete search history.

(56) References Cited

U.S. PATENT DOCUMENTS

| | | | | |
|---|---|---|---|---|
| 4,834,917 A | * | 5/1989 | Ramm | ...................... B09B 1/00 588/15 |
| 2013/0109903 A1 | * | 5/2013 | Persaud | .............. C04B 33/1327 588/11 |
| 2014/0221720 A1 | * | 8/2014 | Moricca | .................. G21F 5/005 588/11 |

* cited by examiner

Primary Examiner — Edward M Johnson
(74) Attorney, Agent, or Firm — Finnegan, Henderson, Farabow, Garrett & Dunner, LLP

(57) ABSTRACT

A canister for interim storage and subsequent consolidation of waste materials via hot pressing and comprising at least one ion exchange material. The canister is configured to house the ion exchange material after it is exchanged with a contaminating ion without releasing the contaminating ion and to consolidate waste materials via hot-isostatic pressing. A method comprising contacting a fluid waste with an ion exchange material.

33 Claims, 4 Drawing Sheets

PRIOR ART

INTEGRATED ION-EXCHANGE DISPOSAL AND TREATMENT SYSTEM

This application claims the benefit of priority to U.S. Provisional Application Nos. 62/443,254, filed Jan. 6, 2017, which is incorporated herein by reference in its entirety.

TECHNICAL FIELD

The disclosed embodiments generally relate to a canister for interim storage and subsequent consolidation of waste materials via hot pressing. There is also disclosed methods for treating contaminated ion exchange material, such as radioactively contaminated HEPA filter, using the disclosed canister as a hot isostatic press (HIP) can, and HIPing the material contained therein.

BACKGROUND

Ion exchange is one of the most common and effective treatment methods for removing radioactive isotopes from contaminated liquid waste streams. Despite its advanced stage of development, various aspects of ion exchange technology are being studied in many countries to improve its efficiency and economy in its application to radioactive waste management. Spent ion exchangers are considered a problematic waste, that in many cases require special approaches and precautions during immobilization to meet the acceptance criteria for disposal.

For example, spent Ion exchange resins and media can be treated in several ways where the media is removed from the housing (cartridge) either by dissolution or physical removal, which requires handling processes. This is problematic because of the dangers associated with handling radioactive materials.

Some of the proposed methods of treatment of the spent ion exchange media include processes to incinerate the resins and produce an ash, then the ash could be immobilized in cement, bitumen, polymer, glass or a ceramic. Alternatively, they can be just encased in a high integrity container. However, each of these options have disadvantages. For example, cement is readily available and not expensive. It is also compatible with a wide range of materials and has excellent radiation stability. However, it is known to swell because of presence of organic bead resins which may cause cracking of a cement containing matrix. In addition, this can cause a problem in that the waste loading can be low. Thus, the volume of the final waste form is generally greater than the original waste volume. It also has moderate leach resistance for many radionuclides, for example caesium With regard to bitumen based immobilization, this material is known to have good leach resistance and can handle good waste loading. However, it is know that the waste form will soften at moderate temperatures, and thus requires a container to maintain structural stability. In addition, organic bead resins may swell and compromise the waste form if there is prolonged contact with water. Thus, the organic waste form may be flammable and subject to biodegradation. It also has lower radiation stability than cement.

With regard to the use of polymers based immobilization, there are a wide variety of polymers are available, many of which have good leach resistance. However, polymers are generally more expensive than bitumen or cement. In addition, polymerization reactions can be affected by trace materials in the waste. In addition, polymers generally have lower radiation stability than cement.

As described, each known potential matrix has limitations. Further, the type of ion exchange material has limitations. For example, organic ion exchange resins decompose with extended exposure to radiation. As a result, the option of incinerating organic resins to ash while effective to stabilize the chemical compound, it does not immobilize the radioactive elements and thus requires further processing.

In the case of inorganic ion exchange media, the radioactive elements can be extracted via chemical route. Alternatively, the media, once removed from the housing, can be treated directly using one of the proposed technologies such as cementation or vitrification. However, existing technologies have substantial issues related to deployment such as large waste volume increases, high potential for contamination spread during handling of loose materials, release of radioactive gases during vitrification processes, chemical incompatibility with existing cement matrices, and low retention of key radionuclides in cementitious waste forms. Thus, inorganic ion exchange media although more resistant to radiation damage, are not currently used in a form suitable for long term storage or disposal.

Although ion-exchange systems are a highly effective method of decreasing short term risk and preventing the spread of activity, their interim storage and long-term disposal options present their own challenges. These concerns include: the potential risks of $H_2$ generation via radiolysis of water; production of steam via self-heating of spent ion-exchangers, leading to container pressurisation; release of adsorbed radionuclides with alterations to solution chemistry; Corrosion of interim storage packages in saline aqueous solutions; and risk of dispersion inherent in the storage of granular materials.

To address and eliminate the foregoing issues, there is described an ion-exchange system in a vessel designed to be dewatered after use for increased stability during interim storage and subsequently consolidated into a stable monolithic waste form via Hot-Isostatic Pressing. The disclosed system would minimize the requirements for handling facilities while reducing the risks of contamination spread during treatment and replacement of exchange media. This is achieved using a purpose designed cartridge system, suitable for performing all three operations.

SUMMARY

Aspects of the present application overcome the drawbacks and limitations of the prior art, although other improvements not recognized the prior art are also disclosed. For example, to achieve desired benefits, and overcome one or more of the previously described deficiencies, there is described a canister for interim storage and subsequent consolidation of waste materials via hot pressing. In one embodiment, the canister comprises at least one ion exchange material, and is configured: to house the ion exchange material after it is exchanged with a contaminating ion without releasing the contaminating ion; and to consolidate via hot-isostatic pressing.

There is also disclosed a method of immobilize waste in a dense monolith, the method comprising: contacting a fluid waste with an ion exchange material, wherein the ion exchange material is located in a canister; evacuating the canister; and hot isostatically pressing (HIP) the canister until it collapses under HIP conditions. In an embodiment, the HIP conditions comprise heat, pressure and time sufficient to consolidate and immobilize the waste material into a dense monolith.

DETAILED DESCRIPTION OF THE DRAWING

Figure 3A:
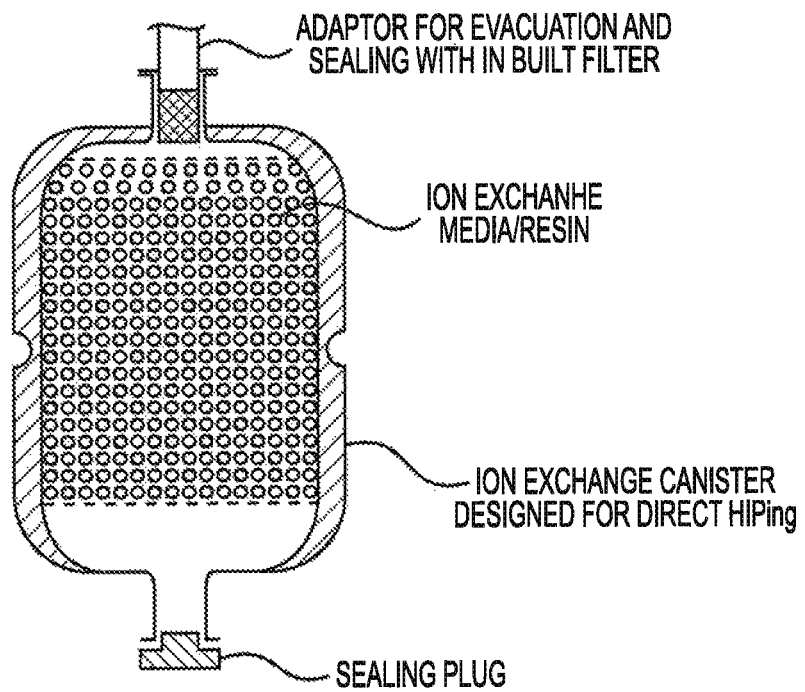
Figure 3B:
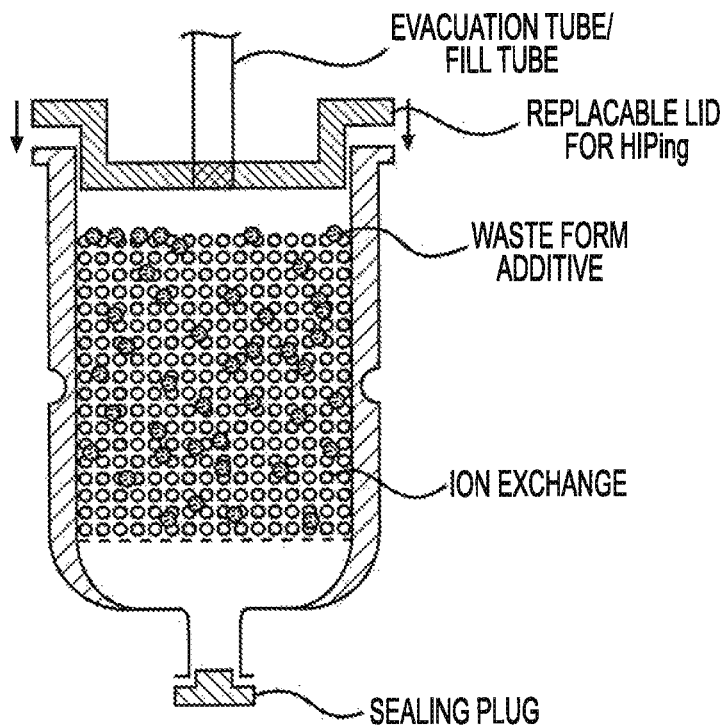

FIG. 3A is a drawing of a canister designed for direct hot-isostatic pressing (HIPing). FIG. 3B further shows an embodiment of FIG. 3A having an interchangeable lid. Waste form additive can be added to either.

Figure 4B:
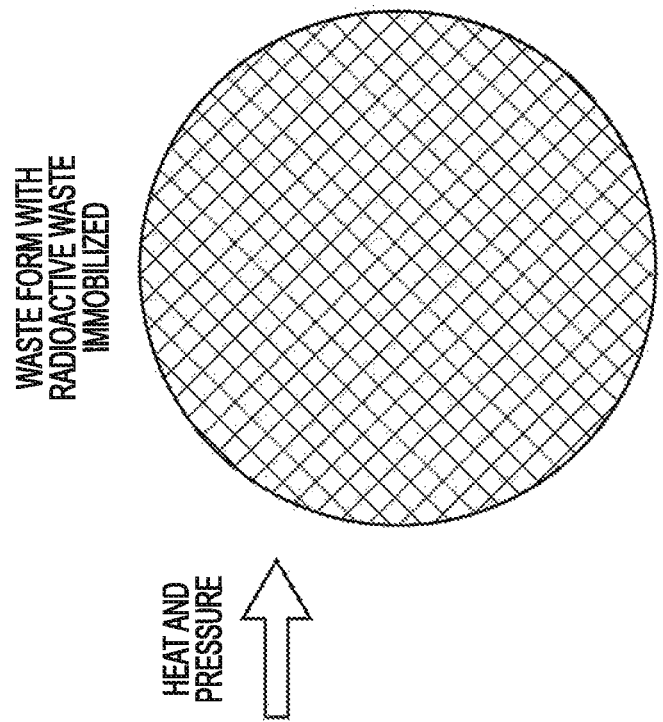
Figure 4A:
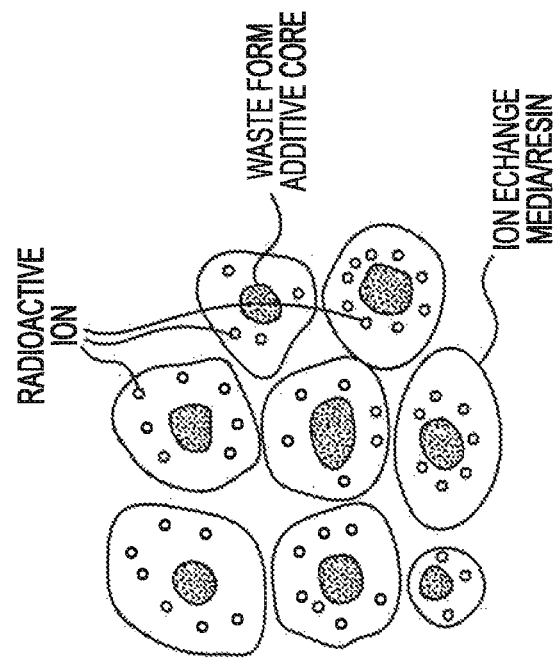

FIG. 4A is a drawing that shows where the ion exchange media has the waste form additives as central core. FIG. 4B shows the media upon drying and application of heat and pressure the mixture of additive, waste ions and ion exchange media combine to make a waste form.

It is to be understood that both the foregoing general description and the following detailed description are exemplary and explanatory only and are not restrictive of the invention, as claimed.

DETAILED DESCRIPTION OF THE INVENTION

Applicants herein disclose a canister in which the ion exchange material or filter systems are housed with the intent of using them as part of the treatment process and the end of the useful life of the ion exchange material. Thus, the canister that houses the ion exchange material is designed such that it can will encapsulate the contents during the HIP process.

A wide range of materials are available for the ion exchange treatment of radioactive materials, such as radioactive liquids. These materials are available in a variety of forms, have widely differing chemical and physical properties and can be naturally occurring or synthetic. Ion exchange materials can be categorized according to their suitability for different applications. Nuclear grade organic ion exchange resins are normally used when liquids from primary circuits or fuel pools are purified. The type of material to be used is selected based on its ability to remove impurities and undesirable ions and to control pH. Nuclear grade ion exchangers are similar to commercial grade resins but have a tighter specification for particle size and composition. Organic resins are often used for a number of treatment cycles by eluting the absorbed radioisotopes with suitable solutions and then restoring the ion exchanger to its original ionic form before its reuse.

Inorganic materials are commonly used for the treatment of liquid waste streams for which very high chemical cleanliness is not required. For example, inorganic ion exchange media can be used in systems in which contaminated liquid is purified for certain recirculation purposes or to reduce the level of radionuclide concentration in the liquid to allow its reclassification. Highly selective inorganic materials also make it possible to utilize ion exchange in the event that very high concentrations of competing ions are present. Inorganic ion exchangers are almost entirely used on a once through basis only.

Figure 1:
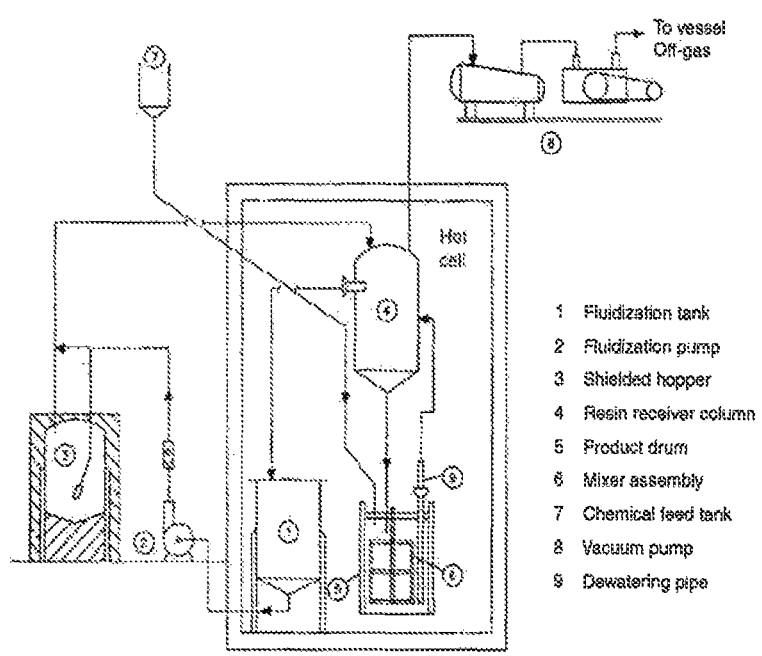
FIG. 1 is a schematic of a prior art system used a cementation process of spent ion exchange resins.
Figure 2:
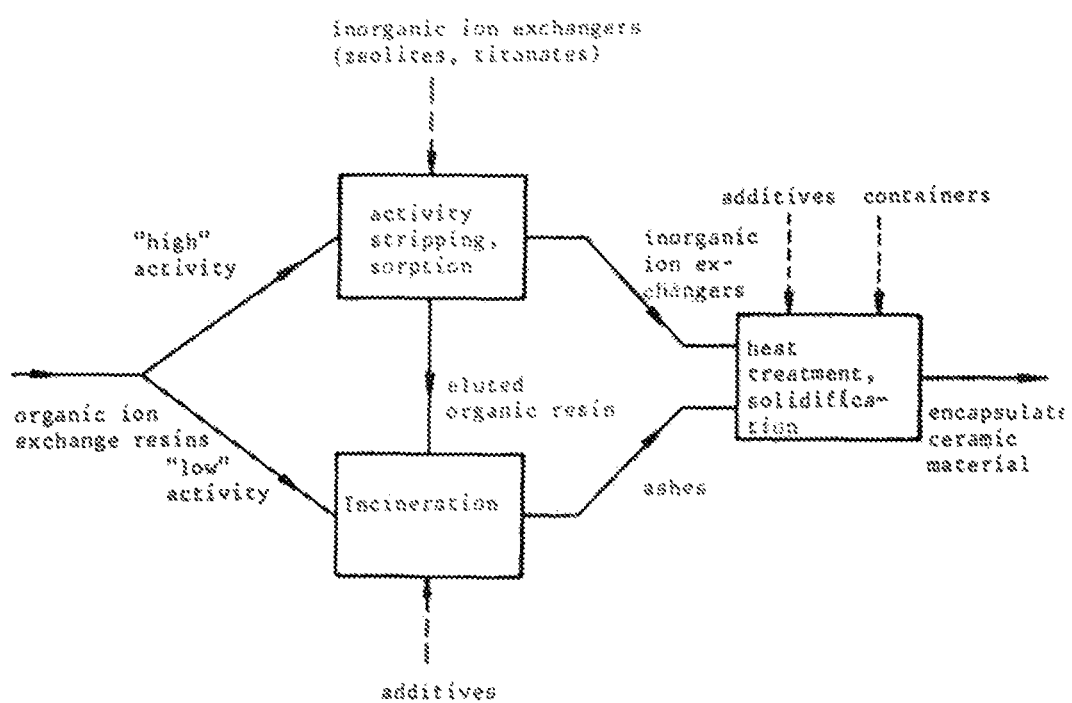
FIG. 2 is a block diagram of a system according to the present disclosure for the treatment of spent organic ion exchange resins.

Applicants further disclose a canister/cartridge in which the ion exchange media or filter systems are housed with the intent of using them as part of the treatment process and the end of the useful life of the ion exchange media or filter. The canister/cartridge described herein reduces or eliminates many of process steps of alternative technologies, as can be seen in FIG. 1 for cementation. The media disclosed herein does not need to be removed or dissolved from its containment housing, eliminating the handling and potential spread of contamination. And for old spent ion exchange cartridges that the resins will have degraded eliminates the issues of removal of product that would no longer be granular or free flowing.

In an embodiment, the canister that houses the ion exchange material is designed such that it can encapsulate the contents during the HIPing process. Thus, the Inventors describe a canister that goes from waste clean-up to a stabilized wasteform without the need for handling of the contaminated ion exchange material. This is especially beneficial when the ion exchange material is contaminated with radioactive ions, other ionizing radiation, or other hazardous contaminants in general. Key design features facilitate the pre-processing steps and feature that allow it to be hot-isostatically pressed (HIPed), including all pre-steps to permit the material to be hot isostatically pressed including thermal pretreatment process steps needed to be performed on the ion exchange material.

For example, the canister is configured to allow it to achieve the flexibility required to perform the full function from housing the ion exchange material, even after it has done its job of adsorbing the waste ions from the waste stream. To achieve this function, in an embodiment, the canister is made from an alloy of steel, such as stainless steel.

The Inventors have shown that the canister described can be used as a HIP Can to transform the ion exchange material into a stable wasteform. Thus, there is no need to remove contaminated ion exchange material from the canister prior to final disposal. In various embodiments, the canister is designed to be heated to temperatures that allow for decomposition of ion exchange resins, to be configured with appropriate ports and filters to remove excess watered and unwanted volatiles, to be heated to dry the canister and its components, to further calcine those components, to be sealed, such as hermetically sealed, and subsequently evacuated and to hold a vacuum, and finally to be HIPed and consolidated upon the HIP process.

In addition, the canister can be designed to collapse under HIP conditions or designed to be inserted into an overpack canister to allow for HIPing. An overpack canister is an apparatus for containing radioactive and/or toxic substances to be subjected to high pressures and/or temperatures. A non-limiting example of an overpack canister that can be used is described in U.S. Pat. No. 8,662,338, which is herein incorporated by reference. In the simplest form, an overpack canister is a can-in-can design wherein the canister containing the contaminated ion exchange material is placed inside another container for hot isostatic pressing. The outer can is configured to collapse in a controlled manner, such as by the inclusion of bellows or internal plates.

In another embodiment, the ion exchange media forms a coating on the core of glass or ceramic. After the ion exchange is spent and during the HIP process the core melts/reacts with the ion exchange media to form a waste form.

In an embodiment, there is described a canister for interim storage and subsequent consolidation of waste materials via hot isostatic pressing. The interior of the canister comprises at least one ion exchange material. In various embodiments, the ion exchange material is an integral part of the canister. For example, the ion exchange material may be located as a coating on the walls of the canister.

In another embodiment, the ion exchange material may be located in a filter or cartridge that is housed inside the canister. In one embodiment, the ion exchange material comprises multiple, different types of ion exchange materials depending on the ions that need to be separated. Thus, in some embodiment, the multiple, different types of ion exchange materials are in the form of different layers on the interior surface of the canister, different media located in the canister, different filters, different cartridges, or combinations thereof. As one skilled in the art would appreciate, the different types of ion exchange materials are beneficial when looking to achieve a sequential ion exchange mechanism.

In an embodiment, the canister described herein is configured to house the ion exchange material after it is exchanged with a contaminating ion without releasing the contaminating ion. For example, in an embodiment, the canister further comprises shielding in the walls to prevent the release of ionizing radiation from the canister. The canister is also configured to consolidate the material via hot-isostatic pressing, even with the additional shielding.

The canister described herein may further comprises at least one heating element located at the outer surface or shell of the canister, wherein heating occurs by inductive coupling, resistive, radiative heating, or combinations thereof.

The canister may further comprise at least one port to attach a vacuum, or to introduce fluid or remove fluid from the canister. For example, the fluid comprises a compressed gas, or a liquid selected from water, a slurry or a solution. In an embodiment, the compressed gas is used for a gas flow-through while heating to allow flushing of decomposition products. The vacuum and gas flow-through while heating to allow flushing of decomposition products. In an embodiment, the canister further comprises at least one plate, baffle or pipe that direct flow of the aqueous fluid, such that it is uniform across the ion exchange material.

In an embodiment, the slurry or solution may be used to introduce at least one additive that helps transform the ion exchange material to a stable wasteform after hot isostatic pressing.

Non-limiting examples of the at least one additive is selected from zeolitic minerals, silicate minerals, $SiO_2$, $TiO_2$, phosphate, alumina-borosilicate glass, borosilicate glass, silicotitanate glass, iron-phosphate glass, phosphate glass, lithium oxide, lithium fluoride, calcium fluoride, sodium fluoride, sodium fluorosilicate or a combination thereof. The at least one additive nay be an integral part of the canister or may be added to the canister via an inlet prior to hot isostatic pressing.

In an embodiment, the at least one additive is in the form of beads, the beads comprising a glass, an ion-exchange resin, or combinations thereof. For example, the additive comprises a glass beads and the ion exchange material is in the form of a coating on the surface of the glass beads.

In another embodiment, the canister can be lined with glass/additive, so during the HIP process the glass softens fills the void space left by the ion exchange media and or filter. The glass/additive can also be designed to become part of the waste mixture to form a durable waste form for disposal and immobilization of the radioactive species, and protect the steel canister from corrosion in saline solutions.

For example, it is possible that the canister can be loaded with glass/additives, along with the ion exchange media. In an embodiment, the glass/additives may be in the form of beads that form a two-dimensional (2-D) or three-dimensional (3-D) network within the can. During the HIP process the additives become of the waste form.

The canister may further comprise a first lid for storing contaminated ion exchange material in a sealed housing, wherein the first lid is replaceable with a second lid that is configured to accept the contaminated ion exchange material in the sealed housing, wherein the second lid is used for hot isostatic pressing.

The canister described herein further comprises split valve ports, or at least one other opening designed to maintain contamination, that can be hot isostatic pressed and provide contamination control during cartridge changes.

In an embodiment, the canister is configured to be sealed while hot to form a partial vacuum on cooling. The canister may further comprise at least one port for a filter that allows fluid to be removed from the canister, but retains solids in the canister. The canister may further comprise an inlet for a particulate filter made from sand or other granular material.

There is also disclosed a method to immobilize waste in a dense monolith, the method comprising: contacting a fluid waste with an ion exchange material, wherein the ion exchange material is located in a canister; evacuating the canister; and hot isostatically pressing (HIP) the canister until it collapses under HIP conditions. The HIP conditions comprise heat and pressure that are sufficient to consolidate the ion exchange material containing the waste into a dense monolith. For example, the HIP conditions comprise a temperature ranging from 100° C. to 1400° C. and a processing pressure ranging from 15-100 MPa for a time ranging from about 1-16 hours.

In an embodiment, the fluid waste that is contacted with the ion exchange material is a gas or liquid that has been contaminated with radioactive material.

When needed or desired, the method described herein may further comprise inserting the canister into an overpack container prior to hot isostatic pressing.

In an embodiment, the method described herein further comprises adding at least one additive to the container prior to ion exchange, or after ion exchange but prior to hot isostatic pressing, wherein the at least one additive is added in an amount sufficient to achieve at least one of the following: recharge a spent ion exchange material, or transform the ion exchange material to a dense monolith that will immobilize the waste after hot isostatic pressing.

In an embodiment, the method comprises adding at least one additive comprises zeolitic minerals, silicate minerals, $SiO_2$, $TiO_2$, phosphate, alumina-borosilicate glass, borosilicate glass, silicotitanate glass, iron-phosphate glass, phosphate glass, lithium oxide, lithium fluoride, calcium fluoride, sodium fluoride, sodium fluorosilicate or a combinations thereof.

In an embodiment, the method comprises adding at least one additive that is in the form of beads, the beads comprising a glass, an ion-exchange resin, or combinations thereof.

The method described herein that includes adding at least one additive forms a glassy phase that softens and fill void spaces left by the decomposition of the ion exchange media during the hot isostatic pressing, and the glassy phase cools to become part of the final wasteform. The final wasteform comprises radioactive ions that are immobilized in the glassy phase.

The method described herein further comprises dewatering the ion exchange material by pumping out fluid located in the canister. In an embodiment, pumping out fluid located in the canister can be performed through a filter to insure the solids remain in the canister.

Dewatering is generally followed by drying the canister, such as at temperatures ranging from 100-700° C., prior to sealing the canister. Once the canister is dewatered, dried and sealed, it can be hot isostatically pressed.

INDUSTRIAL APPLICABILITY

The disclosed canister allows for direct scalability, the disclosed canister provides improved safety and maximized waste volume reduction. This in turn allows for custom built ion-exchange plants and emergency clean-up operations such as those demanded by the Fukishima disaster. The disclosed canister also allow the replacement/extension of capacity around aging ion-exchange plants.

Applicants additional disclose a method of storing and/or consolidating waste material using the disclosed canister and system. In an embodiment, the method comprises contacting a waste form with an ion exchange media. In non-limiting embodiments, the waste form that is contacted with the ion exchange media is a liquid, such as water that has been contaminated with radioactive material. The ion exchange material, which can be in the form of a media, cartridge, or filter, that is located within the canister, is placed in a HIP system such that the canister becomes the HIP can. Upon the HIPing process, the canister collapses under HIP conditions and consolidates the material contained therein. In an embodiment, the canister may be placed into an overpack canister prior to HIPing.

The HIP process is described in more detail in U.S. Pat. No. 8,754,282, which is herein incorporated by reference in its entirety. More specifically, as described in this patent, the HIP consists of a pressure vessel surrounding an insulated resistance-heated furnace. Treating radioactive calcine with the HIP involves filling the container with the waste materials, here the contaminated ion exchange media. The container is evacuated and placed into the HIP furnace and the vessel is closed, heated, and pressurized. The pressure is typically provided via argon gas, which, at pressure, also is an efficient conductor of heat. The combination of heat and pressure consolidates and immobilizes the waste into a dense monolith.

The HIP will process one can at a time to a temperature, such as a temperature ranging from of about 100° C. to 1400° C. at a processing pressure ranging from 15-100 MPa. The cycle time to process a HIP can ranges from about 1-16 hours. Once removed from the HIP, the can will be allowed to cool to ambient temperature prior to being loaded into a disposal canister. The HIP temperature may also be modified depending on the waste. Various changes in HIP conditions such as temperatures, pressures, and atmospheres depending on the material being consolidated are discussed in U.S. Pat. Nos. 5,997,273 and 5,139,720, which are herein incorporated by reference.

The described canister provides a number of benefits previously not available. It provides an ion-exchange system in a vessel designed to be dewatered after use. This increases stability during interim storage and subsequently allows for the consolidation of the waste into a stable monolithic wasteform via Hot-Isostatic Pressing (HIPing). Thus, the disclosed canister minimizes the requirements for handling facilities while reducing the risks of contamination spread during treatment and replacement of ion exchange media. This is achieved using a purpose designed canister suitable for performing all three operations.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A canister for interim storage and subsequent consolidation of waste materials via hot isostatic pressing, the canister comprising at least one ion exchange material therein, the canister configured to:
   house the ion exchange material after it is exchanged with a contaminating ion without releasing said contaminating ion; and
   consolidate said ion exchange material via hot-isostatic pressing,
   wherein the ion exchange material is located in the interior of the canister as an integral part of the canister or is located in a filter or cartridge that is housed inside the canister.

2. The canister of claim 1, wherein the at least one ion exchange material comprises multiple, different types of ion exchange materials.

3. The canister of claim 2, wherein the multiple, different types of ion exchange materials are in the form of different layers on the interior surface of the canister, different media located in the canister, different filters, different cartridges, or combinations thereof.

4. The canister of claim 3, wherein the different types of ion exchange materials lead to a sequential ion exchange mechanism.

5. The canister of claim 1, wherein said canister is made from an alloy of steel that can be inductively coupled.

6. The canister of claim 1, further comprising at least one heating element located at the outer surface of said canister, wherein heating occurs by inductive coupling, resistive heating, radiative heating, or combinations thereof.

7. The canister of claim 1, further comprising at least one port to attach a vacuum, to introduce fluid, or to remove fluid from the canister.

8. The canister of claim 7, wherein the fluid comprises a compressed gas, or a liquid selected from water, a slurry or a solution.

9. The canister of claim 8, wherein the slurry or solution introduces at least one additive that helps transform the ion exchange material to a stable wasteform after hot isostatic pressing.

10. The canister of claim 1, further comprising at least one additive selected from zeolitic minerals, silicate minerals, $SiO_2$, $TiO_2$, phosphate, alumina-borosilicate glass, borosilicate glass, silicotitanate glass, iron-phosphate glass, phosphate glass, lithium oxide, lithium fluoride, calcium fluoride, sodium fluoride, sodium fluorosilicate or a combination thereof.

11. The canister of claim 10, wherein the at least one additive is an integral part of the canister or is added to the canister via an inlet prior to hot isostatic pressing.

12. The canister of claim 10, wherein the at least one additive is in the form of beads, the beads comprising a glass, an ion-exchange resin, or combinations thereof.

13. The canister of claim 10, wherein the additive comprises a glass beads and the ion exchange material is in the form of a coating on the surface of said glass beads.

14. The canister of claim 1, further comprises shielding in the walls to prevent the release of ionizing radiation from said canister.

15. The canister of claim 1, further comprising a first lid for storing contaminated ion exchange material in a sealed housing, wherein said first lid is replaceable with a second lid that is configured to accept said contaminated ion exchange material in the sealed housing, wherein said second lid is used for hot isostatic pressing.

16. The canister of claim 1, further comprising split valve ports, or at least one other openings designed to maintain, that can be hot isostatic pressed and provide contamination control during cartridge changes.

17. The canister of claim 1, which is configured to be sealed while hot to form a partial vacuum on cooling.

18. The canister of claim 1, further comprising at least one port for a filter that allows fluid to be removed from the canister but retains solids in the canister.

19. The canister of claim 18, further comprising at least one plate, baffle or pipe that direct flow of said aqueous fluid, such that it is uniform across the ion exchange material.

20. The canister of claim 1, further comprising an inlet for a particulate filter made from sand or other granular material.

21. A method of immobilize waste in a dense monolith, the method comprising:
    contacting a fluid waste with an ion exchange material located in a canister;
    evacuating the canister; and
    hot isostatically pressing (HIP) the canister until it collapses under HIP conditions, said conditions comprise heat and pressure that are sufficient to consolidate the ion exchange material containing said waste into a dense monolith, wherein the ion exchange material is located in the interior of the canister as an integral part of the canister, or is located in a filter or cartridge that is housed inside the canister.

22. The method of claim 21, wherein the HIP conditions comprise a temperature ranging from 100° C. to 1400° C. and a processing pressure ranging from 15-100 MPa for a time ranging from about 1-16 hours.

23. The method of claim 21, wherein the fluid waste that is contacted with the ion exchange material is a gas or liquid that has been contaminated with radioactive material.

24. The method of claim 21, further comprising inserting the canister into an over-pack container prior to hot isostatic pressing.

25. The method of claim 21, further comprising adding at least one additive to the container prior to ion exchange, or after ion exchange but prior to hot isostatic pressing, wherein said at least one additive is added in an amount sufficient to achieve at least one of the following: recharge a spent ion exchange material, or transform the ion exchange material to a dense monolith that will immobilize said waste after hot isostatic pressing.

26. The method of claim 25, wherein the at least one additive comprises zeolitic minerals, silicate minerals, $SiO_2$, $TiO_2$, phosphate, alumina-borosilicate glass, borosilicate glass, silicotitanate glass, iron-phosphate glass, phosphate glass, lithium oxide, lithium fluoride, calcium fluoride, sodium fluoride, sodium fluorosilicate or a combinations thereof.

27. The method of claim 26, wherein the at least one additive is in the form of beads, the beads comprising a glass, an ion-exchange resin, or combinations thereof.

28. The method of claim 26, wherein the at least one additive forms a glassy phase that softens and fill void spaces left by the decomposition of the ion exchange media during the hot isostatic pressing, and the glassy phase cools to become part of the final wasteform.

29. The method of claim 28, wherein the final wasteform comprises radioactive ions that are immobilized in the glassy phase.

30. The method of claim 21, further comprising dewatering the ion exchange material by pumping out fluid located in the canister, drying said canister, sealing the canister prior to hot isostatic pressing.

31. The method of claim 30, wherein pumping out fluid located in the canister prior to hot isostatic pressing is performed through a filter to keep the solids in said canister.

32. The method of claim 30, wherein drying is performed at temperatures ranging from 100–700° C.

33. The method of claim 21, wherein the ion exchange material comprises multiple, different types of ion exchange materials that lead to a sequential ion exchange.

* * * * *